United States Patent [19]
Lack et al.

[11] Patent Number: 5,794,742
[45] Date of Patent: Aug. 18, 1998

[54] VIBRATION DAMPER WITH A KNUCKLE EYE FOR A MOTOR VEHICLE AND A KNUCKLE EYE FOR A VIBRATION DAMPER FOR A MOTOR VEHICLE

[75] Inventors: Sabine Lack, Schweinfurt; Günther Braun, Geldersheim, both of Germany

[73] Assignee: Fichtel & Sachs AG, Schweinfurt, Germany

[21] Appl. No.: 736,078

[22] Filed: Oct. 25, 1996

[30] Foreign Application Priority Data

Oct. 26, 1995 [DE] Germany .............. 195 39 911.0

[51] Int. Cl.⁶ .................. F16B 45/00; F16F 9/54
[52] U.S. Cl. .................. 188/321.11; 267/220
[58] Field of Search .............. 188/321.11, 317, 188/318, 299; 267/220, 120, 64.11, 64.13, 129, 153, 141, 141.3–141.5, 292, 293, 260, 264, 269–270; 403/265, 266, 267, 268, 269, 122, 135, 140, 133

[56] References Cited

U.S. PATENT DOCUMENTS

| | | |
|---|---|---|
| 2,538,658 | 1/1951 | Saurer .................. 267/141.5 |
| 3,343,833 | 9/1967 | Fader . |
| 4,020,929 | 5/1977 | Goldin .................. 188/321.11 |
| 4,268,018 | 5/1981 | Langanke .................. 267/120 |
| 4,962,834 | 10/1990 | Miner .................. 188/321.11 |
| 5,017,328 | 5/1991 | Mazurek .................. 267/153 |
| 5,261,650 | 11/1993 | Hein .................. 267/153 |
| 5,358,225 | 10/1994 | Völpel et al. .................. 267/120 |
| 5,609,433 | 3/1997 | Pazdirek et al. .................. 403/122 |
| 5,615,967 | 4/1997 | Hellon .................. 403/122 |

FOREIGN PATENT DOCUMENTS

| | | | |
|---|---|---|---|
| 899650 | 6/1962 | United Kingdom .................. 267/220 |
| 2247934 | 3/1992 | United Kingdom .................. 188/321.11 |
| 2297601 | 8/1996 | United Kingdom . |

*Primary Examiner*—Douglas C. Butler
*Attorney, Agent, or Firm*—Nils H. Ljungman and Associates

[57] ABSTRACT

Knuckle eye, in particular for a vibration damper, comprising a plastic body which has a transverse opening for a fastening device, a connection opening for the connection to the unit to be supported, whereby the connection opening has a metal reinforcement sleeve to increase the strength of the connection. The reinforcement sleeve, by way of a portion which deviates from the uniformly round shape, forms a positive or interlocking connection with the plastic body, whereby a reinforcement band is inserted into the plastic body concentric to the transverse opening, which reinforcement band partly surrounds the reinforcement sleeve in the vicinity of the positive connection.

17 Claims, 7 Drawing Sheets

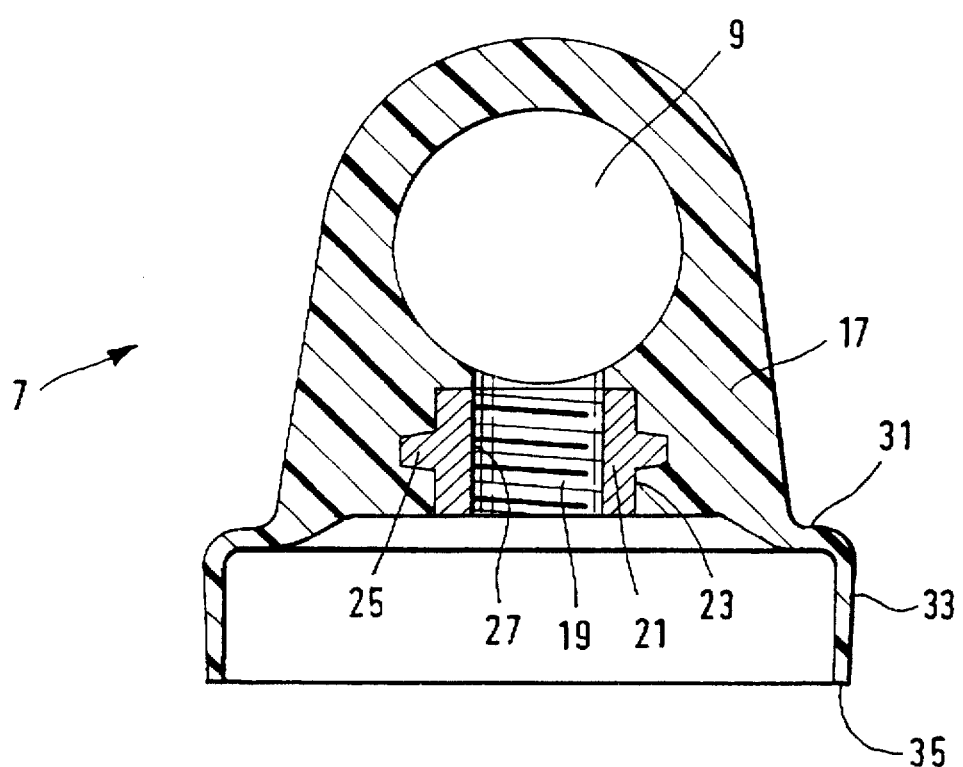

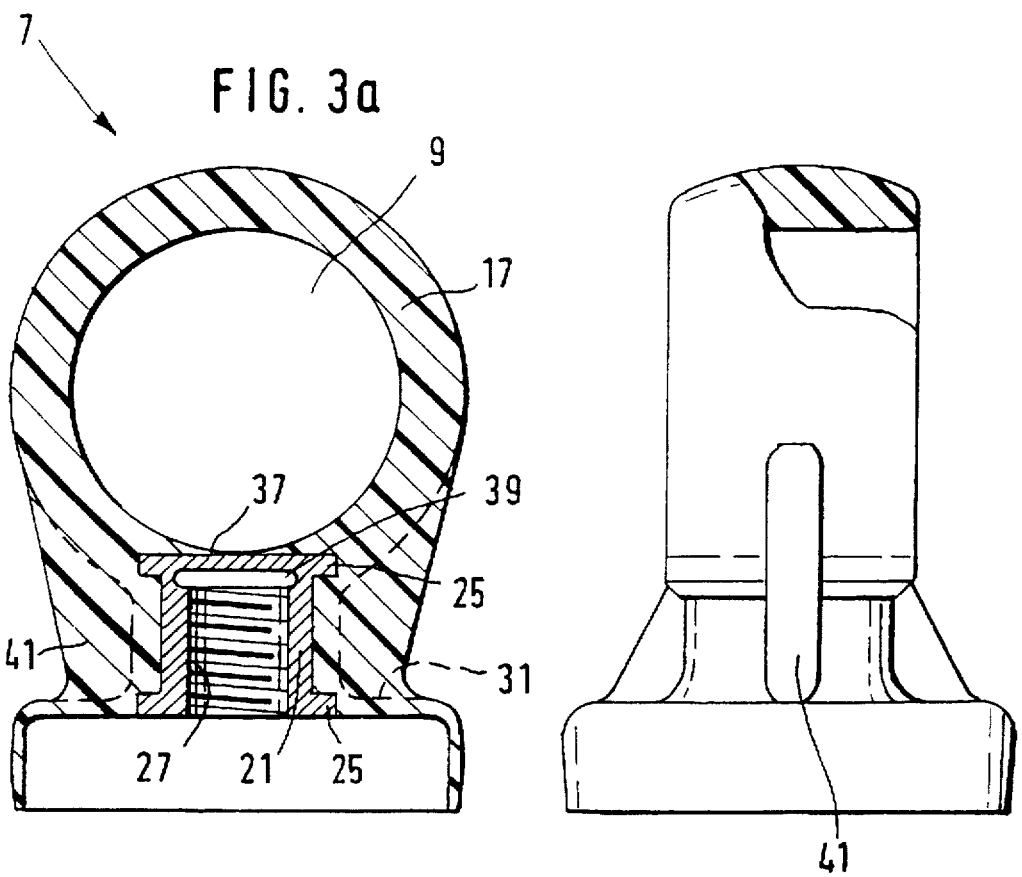
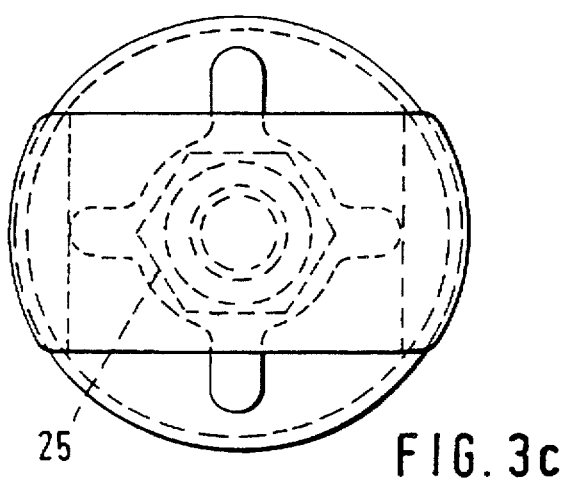

VIBRATION DAMPER WITH A KNUCKLE EYE FOR A MOTOR VEHICLE AND A KNUCKLE EYE FOR A VIBRATION DAMPER FOR A MOTOR VEHICLE

BACKGROUND OF THE INVENTION

1. Field of the Invention

The present invention generally relates to a knuckle eye in particular for a vibration damper, comprising a plastic body which has a transverse opening for a fastening means, and a connection opening for the connection to the unit to be supported. The connection opening has a metal reinforcement sleeve to increase the strength of the connection, which reinforcement sleeve forms a positive or interlocking connection with the plastic body by means of a portion which deviates from the uniformly round shape.

2. Background Information

A similar known knuckle eye is disclosed in U.S. Pat. No. 3,343,833. Unfortunately, a plastic knuckle eye like the one disclosed in U.S. Pat. No. 3,343,833 cannot be used, because it is incapable of transmitting the necessary forces. This inability to transmit sufficiently large forces is why such plastic knuckle eyes have not come into widespread use, in particular on vibration dampers.

OBJECT OF THE INVENTION

The object of the present invention is to realize a plastic knuckle eye in which the required minimum retaining forces can be essentially guaranteed.

SUMMARY OF THE INVENTION

The present invention teaches that this object can be accomplished by a reinforcement band inserted into the plastic body concentric to the transverse opening, which reinforcement band partly surrounds the reinforcement sleeve in the vicinity of the positive connection. At least one reinforcement rib can be realized on the plastic body, at least in the outer portion of the transverse opening.

As a result of the use of the reinforcement band, the plastic body is permanently strengthened in the vicinity of the transverse opening. The added costs incurred are small, and are far outweighed by the beneficial effects obtained. Moreover, the size of the knuckle eye is essentially advantageously not increased by the use of the reinforcement band.

In an additional advantageous embodiment, the invention teaches that the reinforcement band can have a cylindrically shaped guide projection which is adjacent to retaining tabs which extend radially inward. The injection mold can be simplified, because the reinforcement sleeve and the reinforcement band are oriented with respect to one another. The two parts can be slipped apart on account of the retaining tabs. Overall, the reinforcement sleeve and the reinforcement band form a reinforcement unit essentially for the entire knuckle eye. Depending on the size of the knuckle eye, a second guide projection on the reinforcement band can be shaped concentric to the reinforcement sleeve, which second guide projection begins at the retaining tabs. As a result of this measure, the orientation of the relative positions of the two reinforcement parts can be improved.

In accordance with one advantageous feature, the second guide projection has a contour which is adapted to the outer contour of the reinforcement sleeve. Sharp-edged transitions between the reinforcement band and the plastic body are essentially eliminated. Such sharp edges would reduce the useful life of the knuckle eye.

To enlarge the contact surfaces inside the positive connection between the reinforcement sleeve and the reinforcement band, the retaining tabs can have a recess, the geometry of which can be adapted to the outer contour of the reinforcement sleeve.

To prevent relative movements between the reinforcement sleeve and the knuckle eye, the reinforcement sleeve forms a positive connection with the plastic body, at least by means of one area of the outer cylindrical surface of the reinforcement sleeve which deviates from an essentially uniformly round shape. For example, the invention teaches that the area which deviates from the round shape can be realized in the form of a polygon.

To axially secure the knuckle eye, the area which deviates from the round shape is formed by at least one encircling collar. The invention teaches that it is particularly advantageous if the encircling collar is attached to the reinforcement sleeve on either or both end sides. In this variant embodiment, the quality of the guidance of the reinforcement sleeve is particularly good.

It is also advantageous if the reinforcement sleeve has a bottom on the end facing the transverse opening. The bottom facilitates the amount of work involved in sealing inside the injection mold, so that no material can penetrate into the connection opening.

So that the knuckle eye has the specified minimum strength, the plastic body can be realized so that it has a particularly thick wall. The invention, however, teaches that it is much more advantageous if at least one reinforcement rib is realized on the plastic body, at least in the outer area of the transverse opening. This reinforcement rib increases the strength to a very much greater extent, because the material fibers of the plastic are oriented or aligned to a much greater extent than in mere accumulations of material on particularly high wall thicknesses.

The invention teaches that it is advantageous if the height of the reinforcement fin at a maximum is as great as the thickness of the material in the remaining area of the transverse opening, and also if, when there are a plurality of reinforcement ribs, one such reinforcement rib is realized on each edge of the plastic body.

Because the plastic body has an overlapping surface with a ring-shaped wall for the fastening of a protective tube, the knuckle eye is particularly well suited for use in vibration dampers, shock absorbers and gas-filled struts, the piston rods of which must be protected against dust and dirt. It is additionally possible to connect the overlapping surface with the remainder of the plastic body by means of reinforcement ribs.

When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to the embodiments illustrated in the accompanying drawings, in which:

FIG. 2 illustrates a cross-section of a knuckle eye;

FIG. 3a is cross-section of another possible embodiment;

FIG. 3b is a side-view, showing a partial section, of the same embodiment as FIG. 3a;

FIG. 3c is a plan view of the same embodiment as FIGS. 3a and 3b;

FIG. 4b is a side-view, showing a partial section, of the same embodiment as FIG. 4a;

FIG. 5b is a side-view, showing a partial section, of the same embodiment as FIG. 5a;

DESCRIPTION OF THE PREFERRED EMBODIMENT

Figure 1:
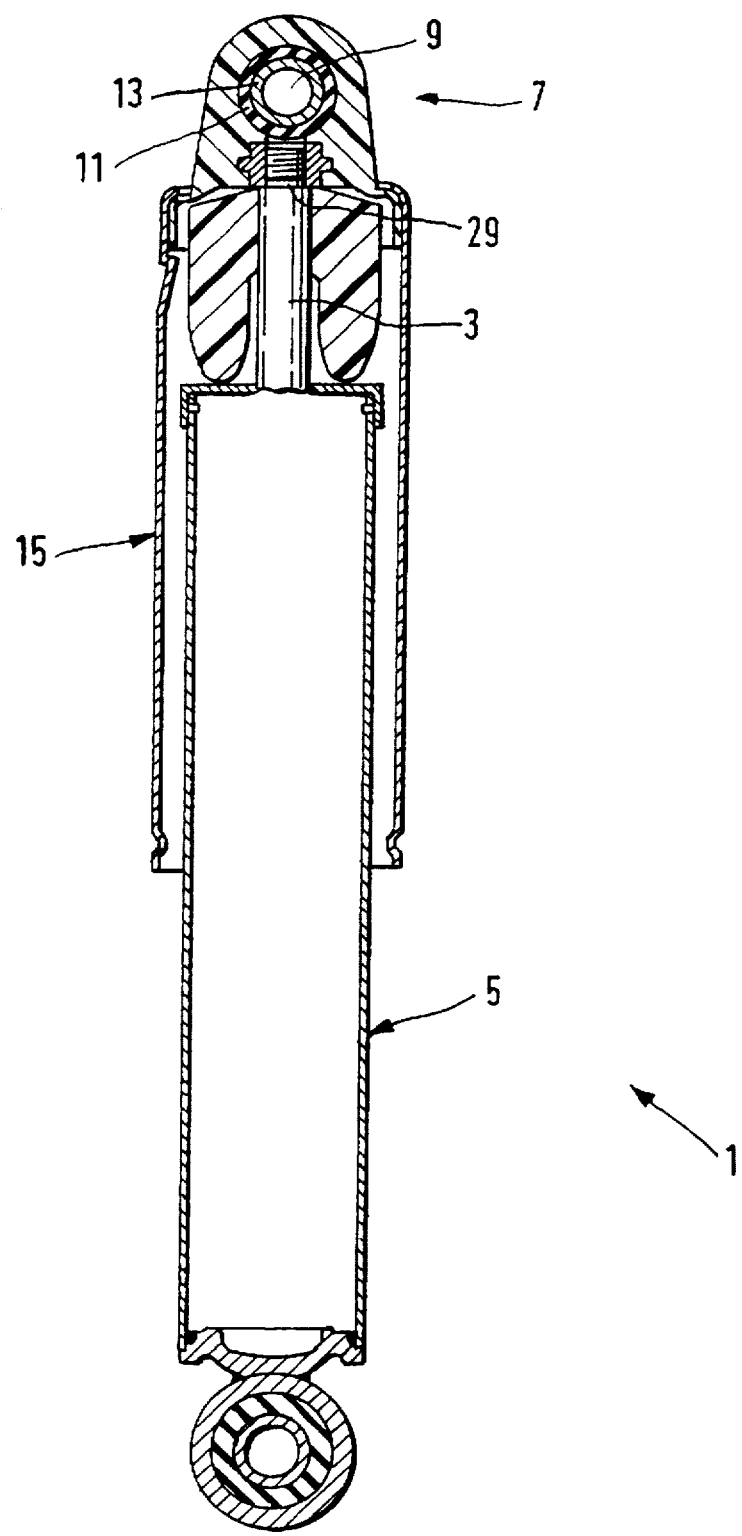
FIG. 1 shows a cross-section of a knuckle eye on a vibration damper.

FIG. 1 illustrates a vibration damper 1, although the internal components have been omitted from the illustration for purposes of simplicity. However, it should be understood that the invention is not limited exclusively to use on vibration dampers. Inside the vibration damper there is a piston rod 3, the end of which is outside a cylinder 5, and has a knuckle eye 7. To fasten the knuckle eye 7, the piston rod 3 has a thread. Inside a transverse opening 9 of the knuckle eye 7, a universally deformable rubber ring 11 is introduced, whereby a liner or bushing is pressed into the rubber ring 11. A protective tube 15 encloses the piston rod 3 and prevents the penetration of dirt.

In accordance with one embodiment, this liner or bushing can be considered to be represented by reference numeral 13.

FIG. 2 shows the knuckle eye 7 as an individual component. In accordance with this embodiment, the knuckle eye 7 essentially includes a plastic body 17 which has a transverse opening 9 for fastening means. A connection opening 19 is realized in the axial direction, and a reinforcement sleeve 21 is located in the connection opening 19. The reinforcement sleeve 21, by means of areas of its outer cylindrical surface 23 which preferably deviate from a uniformly round shape, forms a positive connection with the plastic body 17. For example, it is appropriate for the reinforcement sleeve 21 to include a polygonal profile which can be manufactured as a standard part. A relative rotational movement between the plastic body 17 and the reinforcement sleeve 21 can be essentially prevented. An encircling collar 25 can counteract a translational relative movement. A counter thread 27 which matches the thread of the piston rod 3 can be worked or machined inside the reinforcement sleeve 21. When assembled, the reinforcement sleeve 21 is supported on a shoulder 29 (FIG. 1) of the piston rod 3.

For the protective tube 15, the plastic body 17 has an overlapping surface 31 with a ring-shaped wall 33. The protective tube 15 is supported on the overlapping surface 31 and on one end surface 35 of the ring-shaped wall 33.

During the manufacture of the knuckle eye 7, the reinforcement sleeve is placed in an injection mold, whereby the counter thread 27 is sealed. The injected plastic envelops the encircling collar 25 and the external cylindrical surface 23 of the reinforcement sleeve 21, as a result of which a non-rotating, non-detachable connection can be formed which reliably and securely transmits the required retaining forces.

FIGS. 3a–c illustrate a variant of FIG. 2, so that only the differences are discussed below. One important difference is that the reinforcement sleeve 21 has the encircling collar 25 on each end side, whereby the collar 25 facing the transverse opening 9 is formed by a bottom 37 of the reinforcement sleeve 21. For the counter thread 27, the reinforcement sleeve 21 has an undercut or relief groove 39 which can preferably simplify the manufacture of the counter thread 27.

Reinforcement ribs 41 are attached between the overlapping area 31 and the rest of the plastic body 17. The plan view of FIG. 3c shows the polygonal profile of the outer cylindrical surface 23 of the reinforcement sleeve 21, which was described above with reference to FIG. 2.

In accordance with one embodiment, FIG. 3b can be considered to show the ribs 41.

FIGS. 4a–c and 5a–c illustrate variants of FIGS. 2 and 3. In accordance with these embodiments, as an additional measure to increase strength, the plastic body 17 of the knuckle eye 7 has a reinforcement band 43 which partly surrounds the reinforcement sleeve 21 in the vicinity of the positive connection. The reinforcement band 43 is oriented concentric to the transverse opening 9 and has a guide projection 45, adjacent to which are retaining tabs 47 which extend radially inward. Concentric to the reinforcement sleeve 21 there is a second guide projection 49 which begins at the retaining tabs 47. The retaining tabs 47 provide the axial connection between the reinforcement sleeve 21 and the reinforcement band 43, while the guide projections 45, 49 guarantee the orientation of the relative positions of these components. In addition, the reinforcement components can be assembled into a prefabricated assembly before they are inserted into the injection mold.

Figure 4C:
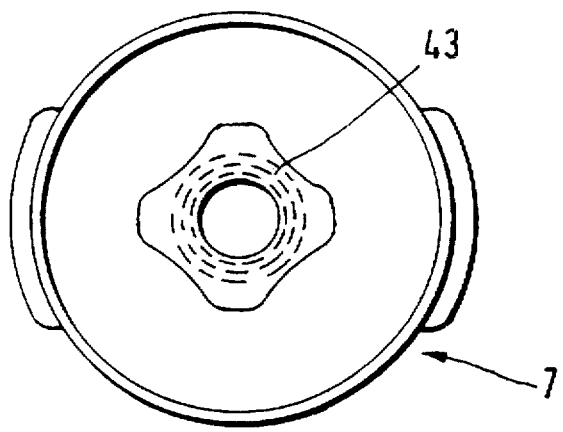
FIG. 4c is a plan view of the same embodiment as FIGS. 4a and 4b.
Figure 4A:
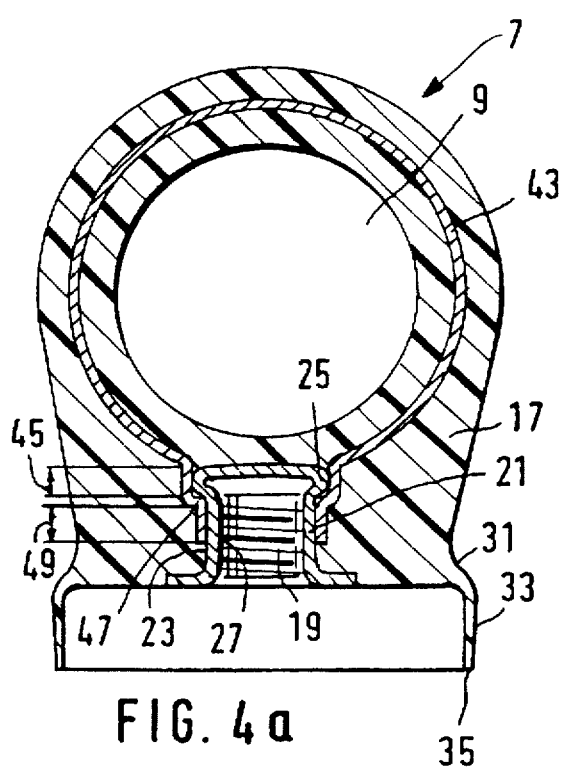
FIG. 4a is cross-section of another possible embodiment.
Figure 4B:
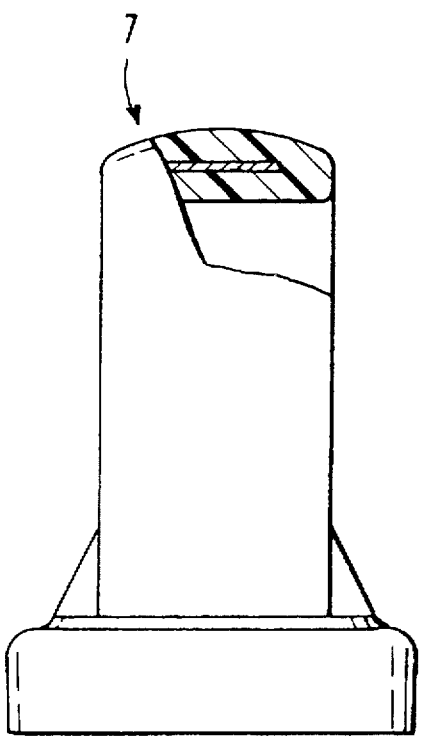
Figure 5C:
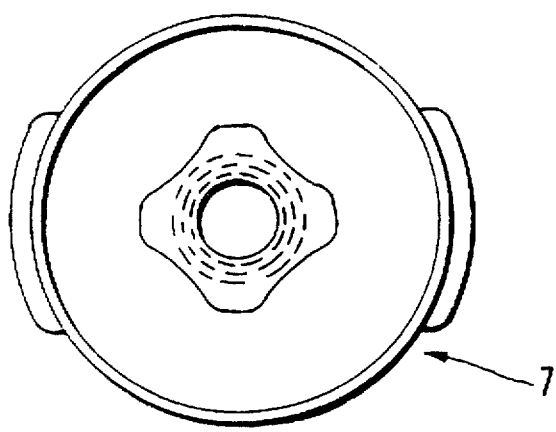
FIG. 5c is a plan view of the same embodiment as FIGS. 5a and 5b.
Figure 5A:
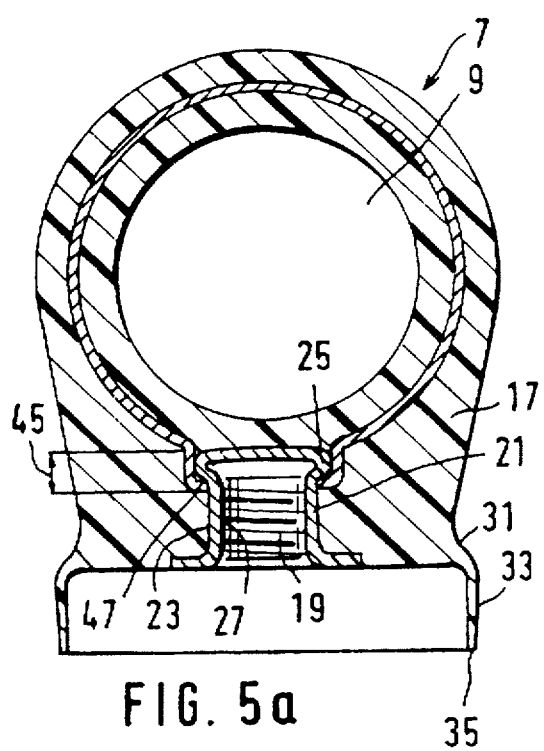
FIG. 5a is cross-section of another possible embodiment.
Figure 5B:
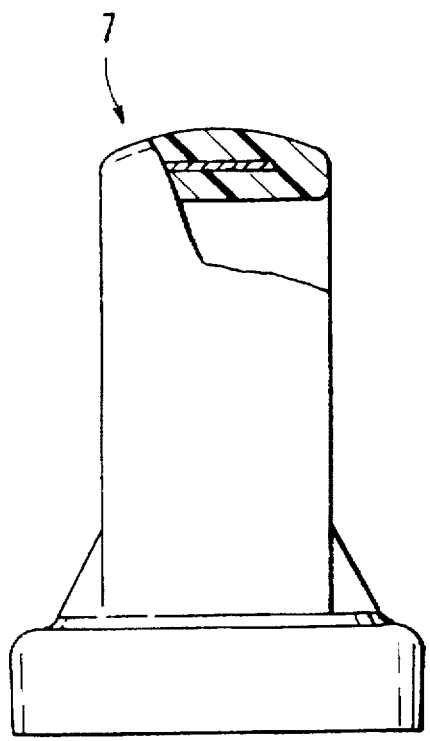

In the embodiment illustrated in FIGS. 5a–c, the second guide projection 49, of the embodiment of FIGS. 4a–c, has been eliminated, to demonstrate that with correspondingly short reinforcement sleeves, it is possible to use a reinforcement band 43.

Referring back to FIGS. 4a–c, to enlarge the contact surface between the reinforcement sleeve 21 and the reinforcement band 43, the second guide projection 49 can be adapted to the external contour of the reinforcement sleeve 21. The bottom view of the knuckle eye shows that the second guide projection 49 is in direct contact with the reinforcement sleeve 21. For that purpose, the retaining tabs 47 can be provided with recesses, the geometry of which is adapted to the outer contour of the reinforcement sleeve 21.

Figure 6A:
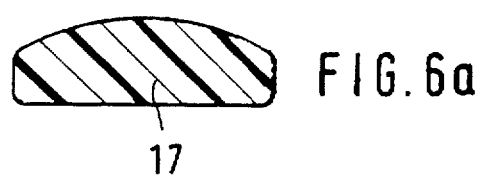
FIGS. 6a, 6b and 6c illustrate other possible embodiments of a portion of the invention.
Figure 6B:
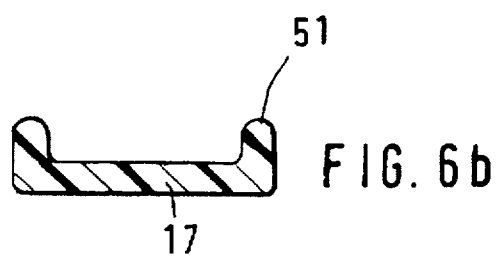
Figure 6C:
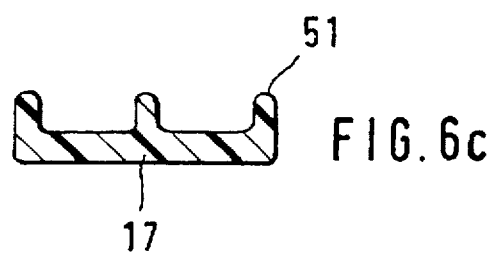

As an alternative to the reinforcement band 43, it is possible to provide the profile of the plastic body 17 in the outer area of the transverse opening 9 with at least one reinforcement rib 51, as illustrated in FIGS. 6a–c. The illustrated cross sections are drawn to scale with respect to one another. The invention teaches that it is possible to achieve a higher strength of the knuckle eye 7 by using a plurality of ribs and less material. The cause of the increased strength is not the bending section modulus or bending resistance moment of the profile—which can be very much lower—but in the improved fiber distribution accompanied by reduced wall thicknesses of the plastic body 17. Of course, the embodiments illustrated in FIGS. 4a–c or 5a–c can also be combined as appropriate with the reinforcement ribs 51 illustrated in FIGS. 6a–c.

In accordance with yet other embodiments, the embodiments illustrated in FIGS. 2 and 3a–c can also be combined as appropriate with the reinforcement ribs 51 illustrated in FIGS. 6a–c.

Figure 7:
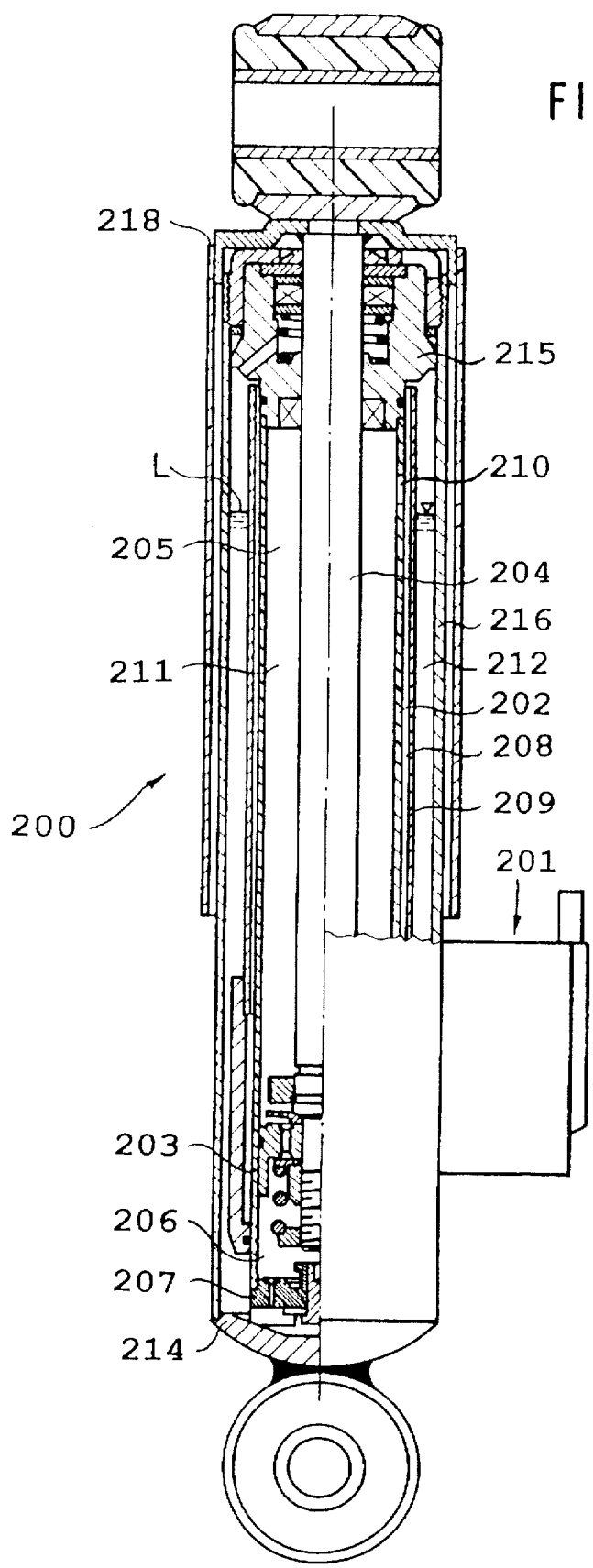
FIG. 7 illustrates a standard shock absorber.

FIG. 7 shows a typical shock absorber or vibration damper in which the embodiments of the present invention may conceivably be incorporated. It should be understood that the components found hereinbelow are interchangable, where appropriate, with the components discussed hereinabove with reference to FIGS. 1 through 6.

FIG. 7 shows a complete shock absorber or oscillation damper 200, a detailed illustration of the valve unit 201 being omitted for the sake of clarity. The oscillation damper 200 essentially includes a pressure pipe 202 in which a piston 203 on a piston rod 204 divides a working space 205 into an upper or piston-rod-side working chamber 211 and a lower working chamber 206. A bottom valve unit 207 closes the pressure pipe 202 at the lower end thereof. A fluid path 208 is formed between the pressure pipe 202 and an intermediate pipe 209, said intermediate pipe 209 being arranged concentrically with respect to the pressure pipe 202. A connecting orifice 210 in the pressure pipe 202 connects the upper working chamber 211 with the fluid path 208. A compensating chamber 212 is confined between the intermediate pipe 209 and a portion of the pressure pipe 202, on the one hand, and the container tube 216 on the other hand. This compensating chamber 212 is axially limited by a base member 214 and a piston rod guiding and sealing unit 215. Both the upper and the lower working chambers 211, 206 are preferably filled with a liquid. The compensating chamber 212 is also filled with damping liquid up to the level L, and possibly contains a pressurized gas above the level L. The bottom valve unit 207 provides communication between the working chamber 206 and the compensating chamber 212. The piston 203 provides communication between the lower working chamber 206 and the upper working chamber 211. According to an illustrative example, the oscillation damper works as follows: When the piston rod 204 moves upwards, a high flow resistance occurs across the piston 203 and a high pressure is generated in the upper working chamber 211. Liquid from the upper working chamber 211 flows through said high flow resistance into the lower working chamber 206. As the piston rod 204 moves outward of the working space 205, the available volume within the working space 205 is increased. Therefore, liquid can flow from the compensating chamber 212 through the bottom valve unit 207 into the lower working chamber 206. The flow resistance through the bottom valve unit 207 is small in this phase of operation. The movement of the piston rod 204 with respect to the pressure pipe 202 is damped.

On inward movement of the piston rod 204 fluid flows from the lower working chamber 206 through the piston 203 into the upper working chamber 211. The flow resistance across the piston 203 is relatively small and the flow resistance across the bottom valve unit 207 is relatively large. Therefore, a considerable pressure exists even within the upper working chamber 211. The volume within the working space 205 is reduced by the piston rod 204 entering into the working space 205. Thus, damping liquid must flow from the lower working chamber 206 through the bottom valve unit 207 into the compensating chamber 212. In this phase of operation the flow resistance through the bottom valve unit 207 is high, such that a high pressure occurs within the lower working chamber 206 and also within the upper working chamber 211.

By the connecting orifice 210 and the fluid path 208 the upper working chamber 211 is connected with the compensating chamber 212 via the valve unit 201. As long as the valve unit 201 is closed, the bypass established by the connecting orifice 210, the fluid path 208 and the valve unit 201 is also closed. This is the hardest mode of operation of the oscillation damper. When, however, the valve unit 201 is more or less opened, the bypass is also open. It can be possible to selectively open and close the valve unit or to continuously vary the flow resistance through the valve unit 201.

One feature of the invention resides broadly in the knuckle eye (joint eye or hinge eye), in particular for a vibration damper, comprising a plastic body which has a transverse opening for a fastening means, and a connection opening for the connection to the unit to be supported, whereby the connection opening has a metal reinforcement sleeve to increase the strength of the connection, which reinforcement sleeve forms a positive or interlocking connection with the plastic body by means of a portion which deviates from the uniformly round shape, characterized by the fact that a reinforcement band 41 is inserted into the plastic body 17 concentric to the transverse opening 9, which reinforcement band 41 partly surrounds the reinforcement sleeve in the vicinity 25 of the positive connection.

Another feature of the invention resides broadly in the knuckle eye characterized by the fact that the reinforcement band 41 has a cylindrically shaped guide projection 45 which is adjacent to retaining tabs 47 which extend radially inward.

Yet another feature of the invention resides broadly in the knuckle eye characterized by the fact that concentric to the reinforcement sleeve 21, a second guide projection 49 is molded onto the reinforcement band 43, which second guide projection begins at the retaining tabs 47.

Still another feature of the invention resides broadly in the knuckle eye characterized by the fact that the second guide projection 49 has a contour which is adapted to or matches the outer contour of the reinforcement sleeve 21.

A further feature of the invention resides broadly in the knuckle eye characterized by the fact that the retaining tabs 47 have a recess, the geometry of which is adapted to or matches the outer contour of the reinforcement sleeve.

Another feature of the invention resides broadly in the knuckle eye characterized by the fact that the deviating area is realized in the shape of a polygon.

Yet another feature of the invention resides broadly in the knuckle eye characterized by the fact that the deviating area is formed by at least one encircling band 25.

Still another feature of the invention resides broadly in the knuckle eye characterized by the fact that an encircling collar is attached to each end side of the reinforcement sleeve 21.

A further feature of the invention resides broadly in the knuckle eye characterized by the fact that the reinforcement sleeve 21 has a bottom 37 on the end facing the transverse opening 9.

Another feature of the invention resides broadly in the knuckle eye characterized by the fact that at least one reinforcement rib 51 is realized on the plastic body 17, at least in the outer portion of the transverse opening 9.

Yet another feature of the invention resides broadly in the knuckle eye characterized by the fact that the height of the reinforcement rib 51 is at the maximum as large as the thickness of the material in the remaining portion of the transverse opening.

Still another feature of the invention resides broadly in the knuckle eye characterized by the fact that when there are a plurality of reinforcement ribs 51, a reinforcement rib is always realized on the edge of the plastic body 17.

A further feature of the invention resides broadly in the knuckle eye characterized by the fact that the plastic body has an overlap 31 which has a ring-shaped wall 33 and is used to fasten a protective tube 15.

Another feature of the invention resides broadly in the knuckle eye characterized by the fact that the overlap 31 is also connected to the rest of the plastic body by means of reinforcement ribs 41.

Some examples of vibration dampers and/or piston-cylinder assemblies and various components associated therewith which could possibly utilize the present invention may be disclosed in the following U.S. Pat. Nos. 4,155,144 to Koganei, entitled "Damper Device"; 4,653,735 to Buma, entitled "Suspension for Vehicle"; and 4,795,009 to Tanahashi and Hayashi, entitled "Twin-tube Type Shock Absorber"; 5,560,456 issued on Oct. 1, 1996 to Koch and Heinrichs; 5,547,050 issued on Aug. 20, 1996 to Beck; 5,551,540 issued on Sep. 3, 1996 to Forster and Wirth; 5,435,421 issued Jul. 25, 1995 to Beck; 5,518,225 issued May 21, 1996 to Gubitz; and 5,501,438 issued on Mar. 26, 1996 to Handke et al.

Some examples of air spring assemblies and various components and applications associated therewith which could possibly utilize the present invention may be disclosed in the following U.S. Pat. Nos. 4,741,517 issued May 3, 1988 to Warmuth, et al., entitled "Air Spring with Extensible Fabric Restraining Cylinder"; 4,709,896 issued Dec. 1, 1987 to Wahls and Gryp, entitled "In-seat Suspension"; 4,635,961 issued Jan. 13, 1987 to Lew, entitled "Air-spring Suspension"; and 5,454,455 issued Oct. 3, 1995 to Kundmuller and Christel, entitled "Cylinder Piston Device".

Some examples of piston-cylinder hinge eyes, joints, and various components associated therewith which may be utilized with the present invention may be found in the following U.S. Pat. Nos. 4,326,733 to Rubalcava, entitled "Hydro-pneumatic Suspensions for Automotive Vehicles"; 5,338,055 to Mauz, entitled Independent Wheel Suspension"; 5,133,575 to Zantinge and Aalderink, entitled "Vehicle with Axle Suspension Device with Gas Spring Suspension and Control System Therefor"; 4,635,745 to Myers et al., entitled "Vehicle Air Suspension"; and 4,577, 840 to Meller et al., entitled "Self-pumping Hydropneumatic Spring Leg or Strut with Internal Level Control for Motor Vehicles"; and also in, U.S. patent application Ser. No. 08/573,200, filed on Dec. 15, 1995, entitled "Shock Absorber".

Some examples of plastic materials, and/or methods and/ or apparatus for making same, which may be utilized with the present invention may be disclosed in the following U.S. Pat. Nos. 4,659,766 issued Apr. 21, 1987 to Falk and Kliever, entitled "Graft Copolymer-plasticized PVC Blends as Thermoplastic Elastomers"; 4,957,962 issued Sep. 18, 1990 to Winkler et al., entitled "Fiber Composites"; 5,004, 784 issued Apr. 2, 1991 to Huynh-Ba, entitled "Polymer Blends Containing Isocyanate Reacting Agents"; 5,380,479 issued on Jan. 10, 1995; 5,382,649 issued on Jan. 17, 1995; 5,387,389 issued on Feb. 7, 1995; 5,383,780 issued on Jan. 24, 1995; 5,389,443 issued on Feb. 14, 1995; 5,392,938 issued on Feb. 28, 1995; 5,408,013 issued on Apr. 18, 1995; 429,492 issued on Jul. 4, 1995; 5,431,563 issued on Jul. 11, 1995; and 5,435,960 issued on Jul. 25, 1995.

Some examples of low coefficient of friction materials which may be utilized with the present invention may be disclosed in the following U.S. Pat. Nos. 4,714,740 issued Dec. 22, 1987 to Lee and Golden, entitled "Low Coefficient of Friction Nylon Blend"; 4,654,235 issued Mar. 31, 1987 to Effenberger et al., entitled "Novel Wear Resistant Fluoropolymer-containing Flexible Composites and Method for Preparation Thereof"; and RE32514 (reissue of 4,473, 676) issued Oct. 6, 1987 to Steklenski, entitled "Polymer Compositions Having a Low Coefficient of Friction".

Some examples of piston-cylinder hinge eyes, joints, and various components associated therewith which may be utilized with the present invention may be found in the following patent publications: Federal Republic of Germany Laid-Open Patent Application No. DE-OS 43 39 448,5, filed Nov. 19, 1993.

All of the patents, patent applications and publications recited herein are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A vibration damper assembly for a motor vehicle, comprising:

a vibration damper;

said vibration damper comprising:

a sealed cylinder defining a chamber therein, said cylinder containing a damping fluid;

a piston rod sealingly projecting into said cylinder and being axially displaceable with respect to said cylinder;

a piston being attached to said piston rod, said piston being slidably disposed within said cylinder to sealingly divide said chamber into first and second chambers;

an arrangement for permitting flow of damping fluid between said first and second chambers;

a central longitudinal axis defined through said cylinder, the central longitudinal axis defining a longitudinal direction of said cylinder;

said vibration damper assembly further comprising:

a first end and a second end disposed substantially opposite one another along the longitudinal axis of said vibration damper;

said first end comprising means for connecting to a first element, which first element is external to said vibration damper assembly;

said second end comprising means for connecting to a second element, which second element is external to said vibration damper assembly;

said means for connecting to a first element comprising a knuckle eye;

said knuckle eye comprising:

a first portion comprising a plastic material;

a second portion comprising a plastic material;

at least one receiving opening for receiving, making contact with, and holding a first external element;

said at least one receiving opening being disposed in said first portion;

a sleeve made of metal, said metal sleeve being dimensioned and disposed to reinforce said knuckle eye;

said metal sleeve being disposed in said second portion of said knuckle eye;

a substantially ring-shaped structure being disposed within said first portion to reinforce said knuckle eye;

said substantially ring-shaped structure being disposed about said at least one receiving opening;

said metal sleeve comprising means for connecting said knuckle eye to said vibration damper;

said metal sleeve comprising means for interlockingly connecting with said second portion of said knuckle eye; and said substantially ring-shaped structure comprising a portion being disposed to surround a portion of said metal sleeve adjacent to said means for interlockingly connecting said metal sleeve with said second portion.

2. The vibration damper assembly according to claim 1, wherein:

said metal reinforcement sleeve has a substantially uniformly round shape; and said means for interlockingly connecting said metal sleeve with said second portion comprises a portion of said metal sleeve which deviates from said substantially uniformly round shape.

3. The vibration damper assembly according to claim 2, wherein:

said means for connecting said knuckle eye to said vibration damper comprises an orifice disposed in said metal sleeve;

said piston rod comprises an end configured for being disposed in said orifice in said metal sleeve;

said orifice has a central axis substantially parallel to said longitudinal axis of said vibration damper;

said receiving opening has a central axis; and said central axis of said receiving opening being substantially transverse to said central axis of said orifice.

4. The vibration damper assembly according to claim 3, wherein:

said portion of said substantially ring-shaped structure surrounding said portion of said metal sleeve comprises a guide projection disposed immediately adjacent said metal sleeve;

said guide projection extending in an axial direction substantially parallel to said longitudinal axis of said vibration damper and toward said vibration damper; and said surrounding portion further comprises at least one retaining tab extending radially inward towards said orifice.

5. The vibration damper assembly according to claim 4, wherein:

said metal sleeve has an outer contour;

said at least one retaining tab comprises a recess; and said recess has a contour substantially matching a corresponding area of said outer contour of said metal sleeve.

6. The vibration damper assembly according to claim 5, wherein said deviating portion comprises at least one collar member extending substantially radially outward from said metal sleeve.

7. The vibration damper assembly according to claim 6, wherein:

said metal sleeve has a first end and a second end disposed opposite one another;

said first end is disposed adjacent said vibration damper;

said second end is disposed adjacent said receiving opening; and said second end comprises a bottom portion.

8. The vibration damper assembly according to claim 7, wherein:

said surrounding portion comprises an additional guide projection surrounding and immediately adjacent to said metal sleeve.

said additional guide projection extending from said at least one retaining tab in a direction toward said vibration damper; and said additional guide projection being configured to have a contour substantially the same as a corresponding area of said outer contour of said metal sleeve.

9. The vibration damper assembly according to claim 8, wherein said deviating portion of said metal sleeve is configured in the shape of a polygon.

10. The vibration damper assembly according to claim 7, wherein:

said first portion comprises an inner surface and an outer surface facing away from said inner surface and being substantially concentric to said inner surface;

said receiving opening being disposed adjacent said inner surface;

said outer surface comprises at least one rib extending in a radial direction relative to said central axis of said receiving opening; and said at least one rib being configured to reinforce said knuckle eye.

11. The vibration damper assembly according to claim 10, wherein:

said first portion has a width dimension defined between said outer surface and said inner surface;

said at least one rib having a first extreme end connected to said outer surface, and a second extreme end disposed substantially opposite said first extreme end;

said at least one rib having a height dimension defined between said first extreme end and said second extreme end; and said height dimension being being one of: equal to and less than said width dimension of said first portion.

12. The vibration damper assembly according to claim 11, wherein:

said at least one collar member comprises two collar members, said two collar members being a first and a second collar member;

said first collar member being disposed at said first end of said metal sleeve;

said second collar member being disposed at said second end of said metal sleeve;

said at least one rib comprises a plurality of ribs;

said outer surface of said first portion having an outer edge; and at least one of said plurality of ribs being disposed along said outer edge.

13. The vibration damper assembly according to claim 7, wherein:

said vibration damper comprises a tube member having a first end and a second end disposed substantially opposite to one another;

said second portion comprises a portion substantially overlapping said first end of said tube member;

said overlapping portion comprising a first part and a second part;

said first part extending radially outward; and said second part being substantially ring-shaped and extending substantially orthogonally away from said first part in a direction toward said vibration damper;

said second portion comprises an additional at least one reinforcement rib; and said additional at least one reinforcement rib being configured to connect said overlapping portion to the remaining portion of said second portion and to said first portion.

14. An eye, on a vibration damper for a motor vehicle, for receiving, making contact with, and holding an external element, said eye comprising:

a first portion comprising a plastic material;

a second portion comprising a plastic material;

at least one receiving opening for receiving, making contact with, and holding a first external element;

said at least one receiving opening being disposed in said first portion;

a substantially ring-shaped structure being disposed within said first portion to reinforce said eye;

said substantially ring-shaped structure being disposed about said at least one receiving opening;

said second portion comprising an arrangement for connecting said eye to the vibration damper;

said arrangement for connecting said eye to the vibration damper comprising a sleeve made of metal, said metal sleeve being dimensioned and disposed to mechanically reinforce said eye;

said metal sleeve being configured and disposed to interlockingly connect with said plastic material of said second portion of said eye;

said substantially ring-shaped structure comprising a portion being disposed to surround a portion of said metal sleeve adjacent to said interlocking connection of said metal sleeve with said plastic material;

said metal sleeve having a substantially uniformly round shape; and said interlocking connection comprising a portion of said metal sleeve which deviates from said substantially uniformly round shape.

15. The eye, such as for a vibration damper, according to claim 14, wherein:

said arrangement for connecting said eye to a vibration damper comprises an orifice disposed in said metal sleeve;

said orifice has a central axis;

said receiving opening has a central axis;

said central axis of said receiving opening being substantially transverse to said central axis of said orifice;

said portion of said substantially ring-shaped structure surrounding said portion of said metal sleeve comprises a guide projection disposed immediately adjacent said metal sleeve;

said guide projection extending in a direction substantially parallel to said central axis of said orifice and toward a vibration damper; and said surrounding portion comprises at least one retaining tab extending substantially radially inward toward said orifice; and said surrounding portion further comprises an additional guide projection surrounding and immediately adjacent to said metal sleeve and extending substantially parallel to said central axis of said orifice.

16. An eye, for connecting a supported unit to an external element, said eye comprising:

a first portion comprising a plastic material;

a second portion comprising a plastic material;

at least one receiving opening for receiving, making contact with, and holding an external element;

said at least one receiving opening being disposed in said first portion;

a sleeve, said sleeve being dimensioned and disposed to mechanically reinforce said eye;

said sleeve being disposed in said second portion of said eye;

a substantially ring-shaped structure being disposed within said first portion to reinforce said eye;

said substantially ring-shaped structure being disposed about said at least one receiving opening;

said sleeve comprising an arrangement for connecting said eye to the supported unit;

said sleeve being configured and disposed to interlockingly connect with said second portion of said eye;

said substantially ring-shaped structure comprising a portion being disposed to surround a portion of said sleeve adjacent to said interlocking connection of said sleeve with said second portion;

said sleeve having a substantially uniformly round shape; and said interlocking connection comprising a portion of said sleeve which deviates from said substantially uniformly round shape.

17. The eye, according to claim 16, wherein:

said sleeve comprises a metal material;

said arrangement for connecting said eye to a supported unit comprises an orifice disposed in said metal sleeve;

said orifice has a central axis;

said receiving opening has a central axis;

said axis of said receiving opening is substantially transverse to said axis of said orifice;

said portion of said substantially ring-shaped structure surrounding said portion of said metal sleeve comprises a guide projection disposed immediately adjacent said metal sleeve;

said guide projection extends in a direction substantially parallel to said longitudinal axis of said metal sleeve orifice and toward the supported unit;

said surrounding portion comprises at least one retaining tab extending radially inward toward said orifice; and said surrounding portion further comprises an additional guide projection extending in a direction substantially parallel to said longitudinal axis of said metal sleeve orifice and toward a supported unit.

* * * * *